United States Patent
Scrivano et al.

(10) Patent No.: US 12,321,479 B2
(45) Date of Patent: Jun. 3, 2025

(54) USING A CUSTOM FILESYSTEM TO SECURE THE CONTENTS OF A FILESYSTEM

(71) Applicant: Red Hat, Inc., Raleigh, NC (US)

(72) Inventors: Giuseppe Scrivano, Milan (IT); Alexander Larsson, Stockholm (SE); Pierre-Yves Chibon, Puteaux (FR)

(73) Assignee: Red Hat, Inc., Raleigh, NC (US)

( * ) Notice: Subject to any disclaimer, the term of this patent is extended or adjusted under 35 U.S.C. 154(b) by 302 days.

(21) Appl. No.: 18/162,111

(22) Filed: Jan. 31, 2023

(65) Prior Publication Data
US 2024/0256699 A1   Aug. 1, 2024

(51) Int. Cl.
*G06F 21/62* (2013.01)
*G06F 21/64* (2013.01)

(52) U.S. Cl.
CPC .......... *G06F 21/6227* (2013.01); *G06F 21/64* (2013.01)

(58) Field of Classification Search
CPC .............................. G06F 21/6227; G06F 21/64
See application file for complete search history.

(56) References Cited

U.S. PATENT DOCUMENTS

| | | | |
|---|---|---|---|
| 8,161,012 B1* | 4/2012 | Gerraty | G06F 21/53 718/1 |
| 2017/0235749 A1* | 8/2017 | Beaverson | G06F 16/13 707/747 |
| 2018/0039652 A1 | 2/2018 | Nichols | |
| 2021/0303534 A1* | 9/2021 | Solan | G06F 16/27 |
| 2021/0344480 A1 | 11/2021 | Brown et al. | |
| 2022/0237313 A1 | 7/2022 | Hajnoczi et al. | |
| 2023/0229628 A1* | 7/2023 | Low | H04L 9/0643 707/829 |
| 2023/0350953 A1* | 11/2023 | Bruso | H04L 9/3252 |

OTHER PUBLICATIONS

Edge, Jake, "Composefs for integrity protection and data sharing," Eklektix, Inc., https://lwn.net/Articles/917097/, Dec. 7, 2022, 12 pages.

(Continued)

*Primary Examiner* — Robert B Leung
(74) *Attorney, Agent, or Firm* — Dority & Manning, P.A.

(57) ABSTRACT

A computing device executing a kernel-based operating system creates a content-addressed object store containing files of a filesystem. The computing device generates a metadata file that describes characteristics of the files of the filesystem that are in the content-addressed object store. The computing device, in a kernel of the operating system, generates a Merkle tree of the metadata file and a Merkle tree of the content-addressed object store. The Merkle trees contain hashes of blocks of the metadata file and hashes of blocks of the files in the content-addressed object store. The computing device, in the kernel, verifies that a digest corresponding to the metadata file matches an expected digest for the metadata file and that digests corresponding to the files in the content-addressed object store match expected digests for the files in the content-addressed object store. The computing device mounts the metadata file to a location in the filesystem.

20 Claims, 10 Drawing Sheets

(56) References Cited

OTHER PUBLICATIONS

Larsson, Alexander, "Using Composefs in OSTree," https://blogs.gnome.org/alexl/2022/06/02/using-composefs-in-ostree/, Jun. 2, 2022, 7 pages.
Salis, Vitalis, et al., "RepoFS: File system view of Git repositories," SoftwareX, vol. 9, Jan.-Jun. 2019, pp. 288-292, https://doi.org/10.1016/j.softx.2019.03.007, Mar. 18, 2019, 5 pages.
Author Unknown, "Changes/FsVerityRPM," Fedora Project, https://fedoraproject.org/wiki/Changes/FsVerityRPM, Feb. 14, 2022, 9 pages.
Author Unknown, "Convert a mercurial repo to git," secretgeek.net, https://til.secretgeek.net/mercurial/convert_hg_to_git.html, accessed online Nov. 30, 2022, 3 pages.
Author Unknown, "cvs2git," Argonne National Laboratory, https://www.mcs.anl.gov/~jacob/cvs2svn/cvs2git.html, accessed online Nov. 30, 2022, 4 pages.
Author Unknown, "Ext4 file system: Delayed allocation, dirty datablocks," Adil, https://adil.medium.com/ext4-file-system-delayed-allocation-dirty-data-blocks-35945a49fac5, Aug. 14, 2022, 6 pages.
Author Unknown, "Fitting Everything Together," https://0pointer.net/blog/fitting-everything-together.html, May 3, 2022, 29 pages.
Author Unknown, "fs-verity: read-only file-based authenticity protection," The Linux Kernel documentation, https://www.kernel.org/doc/html/latest/filesystems/fsverity.html, accessed online Jan. 17, 2023, 14 pages.
Author Unknown, "GitHub—containers/composefs: a file system for mounting container images," GitHub, https://github.com/containers/composefs, accessed online Jan. 17, 2023, 4 pages.
Author Unknown, "OSTree Overview," libostree, https://ostree.readthedocs.io/en/stable/manual/introduction/, accessed online Jan. 17, 2023, 4 pages.
Larsson, Alexander, "[PATCH 5/6] composefs: Add documentation," LWN.net, https://lwn.net/ml/linux-kernel/8a9aefceebe42d36164f3516c173f18189f0d7e7.1669631086.git.alexl@redhat.com/, Nov. 28, 2022, 4 pages.
Larsson, Alexander, "[PATCH RFC 0/6] Composefs: an opportunistically sharing verified image filesystem," LWN.net, https://lwn.net/ml/linux-kernel/cover.1669631086.git.alexl@redhat.com/, Nov. 28, 2022, 4 pages.
Corbet, Jonathan, "Protecting files with fs-verity," LWN.net, https://lwn.net/Articles/763729/, Aug. 30, 2018, 4 pages.
Author Unknown, "Anatomy of an OSTree repository," https://ostree.readthedocs.io/en/stable/manual/repo/, accessed online Jan. 17, 2023, 3 pages.
Author Unknown, "fsverity—userspace utility for fs-verity," Canonical Ltd., https://manpages.ubuntu.com/manpages/impish/man1/fsverity.1.html, 2019, 6 pages.
Author Unknown, "Understanding Linux Containers," Red Hat, Inc., https://www.redhat.com/en/topics/containers, Dec. 10, 2019, 9 pages.
Author Unknown, "What's a Linux Container?," Red Hat, Inc., https://www.redhat.com/en/topics/containers/whats-a-linux-container, May 11, 2022, 10 pages.
Corbet, Jonathan, "Yet another try for fs-verity," LWN.net, https://lwn.net/Articles/790185/, Jun. 3, 2019, 6 pages.

* cited by examiner

USING A CUSTOM FILESYSTEM TO SECURE THE CONTENTS OF A FILESYSTEM

BACKGROUND

Filesystems of a computing device running an operating system contain content, such as directories, files, and operating system binaries, however, the content can be modified, leaving the content open to unauthorized changes. The contents of the filesystems may also need to be shared easily and shared with reduced use of computing resources.

SUMMARY

The examples disclosed herein implement a custom filesystem that secures the contents of a file system. In particular, the custom filesystem can create a single file that contains all the metadata of the filesystem, rather than the actual contents of the filesystem, where the files of the filesystem are stored in a content-addressed store. In the kernel of the operating system, fs-verity can be enabled on the single file to generate a Merkle tree of the single file and the single file can then be mounted. As a result, the filesystem and the filesystem contents can be fully cryptographically sealed and immutable.

In one example, a method for securing the contents of a file system is provided. The method includes creating, by a computing device executing a kernel-based operating system, a content-addressed object store containing files of a filesystem. The method further includes generating, by the computing device, a metadata file that describes characteristics of the files of the filesystem that are in the content-addressed object store. The method further includes generating, by the computing device in a kernel of the kernel-based operating system, a Merkle tree of the metadata file and a Merkle tree of the content-addressed object store, wherein the Merkle tree of the metadata file contains hashes of blocks of the metadata file and the Merkle tree of the content-addressed object store contains hashes of blocks of the files in the content-addressed object store. The method further includes verifying, by the computing device in the kernel of the kernel-based operating system, that a digest corresponding to the metadata file matches an expected digest for the metadata file and digests corresponding to the files in the content-addressed object store match expected digests for the files in the content-addressed object store. The method further includes mounting, by the computing device, the metadata file to a location in the filesystem.

In another example, a computing device for securing the contents of a file system is provided. The computing device includes a memory and a processor device coupled to the memory. The processor device is to create a content-addressed object store containing files of a filesystem. The processor device is further to generate a metadata file that describes characteristics of the files of the filesystem that are in the content-addressed object store. The processor device is further to generate a Merkle tree of the metadata file and a Merkle tree of the content-addressed object store, wherein the Merkle tree of the metadata file contains hashes of blocks of the metadata file and the Merkle tree of the content-addressed object store contains hashes of blocks of the files in the content-addressed object store. The processor device is further to verify that a digest corresponding to the metadata file matches an expected digest for the metadata file and digests corresponding to the files in the content-addressed object store match expected digests for the files in the content-addressed object store. The processor device is further to mount the metadata file to a location in the filesystem.

In another example, a non-transitory computer-readable storage medium is provided. The non-transitory computer-readable storage medium includes computer-executable instructions to cause a processor device to create a content-addressed object store containing files of a filesystem. The instructions further cause the processor device to generate a metadata file that describes characteristics of the files of the filesystem that are in the content-addressed object store. The instructions further cause the processor device to generate a Merkle tree of the metadata file and a Merkle tree of the content-addressed object store, wherein the Merkle tree of the metadata file contains hashes of blocks of the metadata file and the Merkle tree of the content-addressed object store contains hashes of blocks of the files in the content-addressed object store. The instructions further cause the processor device to verify that a digest corresponding to the metadata file matches an expected digest for the metadata file and digests corresponding to the files in the content-addressed object store match expected digests for the files in the content-addressed object store. The instructions further cause the processor device to mount the metadata file to a location in the filesystem.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
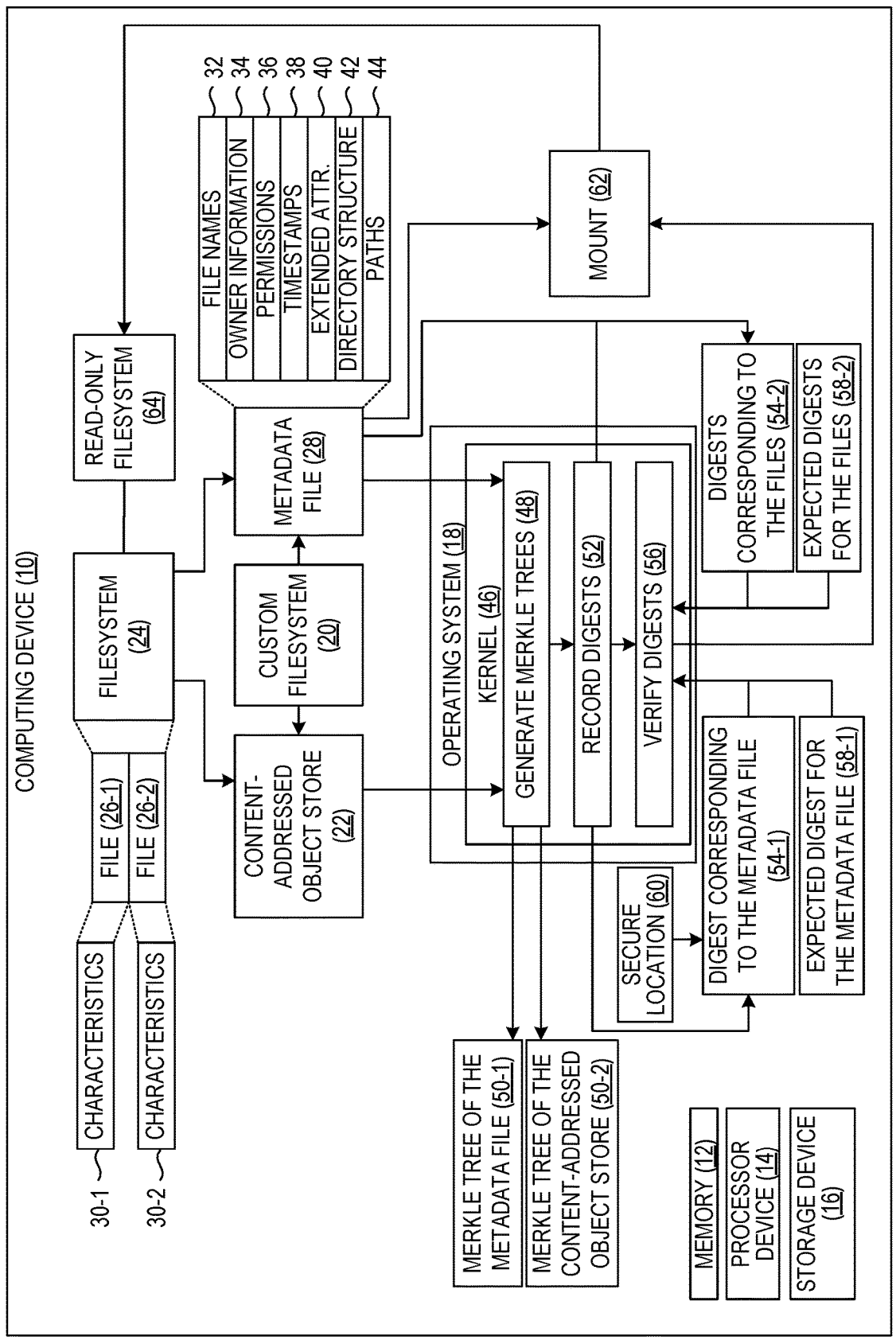
FIG. 1 is a block diagram of a computing device in which examples of securing the contents of a file system may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the elements unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

Filesystems of a computing device running an operating system contain content, such as directories, files, and operating system binaries, however, the content can be modified, leaving the content open to unauthorized changes. The contents of the filesystems may also need to be shared easily and shared with reduced use of computing resources.

A custom filesystem can create a single file that contains all the metadata of the filesystem, rather than the actual contents of the filesystem, where the files of the filesystem are stored in a content-addressed store. In the kernel of the operating system, fs-verity can be enabled on the single file to generate a Merkle tree of the single file and the single file can then be mounted. The files of the filesystem can also have fs-verity enabled. As a result, the filesystem and the filesystem contents can be fully cryptographically sealed and immutable.

The custom filesystem can be read-only and backed by files instead of a block device, easily share content between different directory trees of a filesystem, such as OSTree checkouts, container images, or files stored in a local store, and validate both file content and directory metadata efficiently through the use of fs-verity. Directory and file metadata can be identified in the single file (i.e., a metadata file) and fs-verity can be enabled on the single metadata file, as well as on the files in the filesystem, which seals the metadata and the files from changes, whether accidental or malicious.

The custom filesystem can allow for the sharing of file data on disk and in page cache, as well the validation of filesystem contents on read. The files of the filesystem can be stored in a content-addressed object store. Because the backing file can be content-addressed, the objects directory can be shared for multiple metadata files, and any files that happen to have the same content can be shared.

FIG. 1 is a block diagram of a computing device 10 that comprises a system memory 12, a processor device 14, a storage device 16, and an operating system 18 in which examples of securing the contents of a file system may be practiced. In particular, the operating system 18 may be a kernel-based operating system that the computing device 10 can execute. It is to be understood that although the examples described herein utilize the Linux kernel of the Linux operating system, the examples are not limited to any particular kernel-based operating system. It is to be understood that the computing device 10 in some examples may include constituent elements in addition to those illustrated in FIG. 1. In the example of FIG. 1, the computing device 10 implements a custom filesystem 20 that secures the contents of a filesystem.

The custom filesystem 20 may create a content-addressed object store 22. The content-addressed object store 22 can contain one or more files of a filesystem 24. For instance, the content-addressed object store 22 may contain a file 26-1 and a file 26-2. The files (e.g., file 26-1, file 26-2) can be content files, operating system binaries, or directories, as non-limiting examples.

The custom filesystem 20 may then generate a metadata file 28. The metadata file 28 can be a single binary file, such as an image or .img file, that contains all of the metadata of the filesystem 24, including metadata of the directory and metadata of the files in the directory. The metadata in the metadata file 28 may describe characteristics of the files (e.g., file 26-1, file 26-2) of the filesystem 24. For instance, characteristics 30-1 may correspond to file 26-1 and characteristics 30-2 may correspond to file 26-2. In some examples, the metadata in the metadata file 28 may describe characteristics (e.g., characteristics 30-1, characteristics 30-2) of the files (e.g., file 26-1, file 26-2) of the filesystem 24 including, as non-limiting examples, file names 32, owner information 34, permissions 36, timestamps 38, extended attributes 40, directory structure 42, or paths 44 of the files (e.g., file 26-1, file 26-2) of the filesystem 24. For instance, the characteristics 30-1 of the file 26-1 may include the file name 32 of the file 26-1, the owner information 34 of the file 26-1, the permissions 36 of the file 26-1, the timestamps of the file 26-1, the extended attributes 40 of the file 26-1, and the path 44 to the file 26-1 in the filesystem 24, which can all be described as metadata in the metadata file 28.

The metadata file 28 may not contain the actual contents of the files (e.g., file 26-1, file 26-2) of the filesystem 24. Instead, the metadata file 28 may contain filenames of the real files (e.g., file 26-1, file 26-2) that contain the contents. The contents of the files (e.g., file 26-1, file 26-2) may be content-addressed objects of the content-addressed object store 22. The metadata file 28 can describe characteristics (e.g., characteristics 30-1, characteristics 30-2) of the files (e.g., file 26-1, file 26-2) of the filesystem 24 that are in the content-addressed object store 22. The metadata file 28 can contain information about directory and file metadata (i.e., metadata of file 26-1 and file 26-2) in addition to references to the backing files in the content-addressed object store 22 (e.g., file 26-1, file 26-2). Because the files (e.g., file 26-1, file 26-2) may be in the content-addressed object store 22, the files may effectively be deduplicated at the file level; therefore, files with identical content may be stored one time, including in the instances where the metadata of the files (e.g., the metadata in the metadata file 28) is different. In one example, the path to the directory to be processed can be passed to the command line of the computing device, which can generate the metadata file 28 corresponding to the structure of the directory at the path and containing the metadata of the directory and the files in the directory, and create a content-addressed object store 22 with the contents of the files in the directory. In this example, the content files may be automatically copied into the content-addressed object store 22.

The custom filesystem 20 can then enable fs-verity on the metadata file 28 and the content-addressed object store 22 in a kernel 46 of the operating system 18. fs-verity is a mechanism to protect files from modification. In particular, fs-verity is a checksum mechanism similar to dm-verity, except that fs-verity works on file content instead of partition content. Enabling fs-verity on a file computes hashes stored in hash-tree, such as a Merkle tree, associated with the file, then the hash values can be accessed in order to verify that the file contents have not changed. For instance, the Merkle tree can contain hashes of the blocks (i.e., contents) of the file that has fs-verity enabled. Once fs-verity is enabled on a file, the file becomes read-only and immutable, so any subsequent read from the file will return an error if a change is detected, as a hash will be computed and compared to the hash stored in the tree. For example, when a portion of the file is read from storage, such as a page of the file, the kernel can check that the hash of the page matches the hash in the Merkle tree. If the hash of the page does not match the hash in the Merkle tree, then a change is detected and an error is returned. Therefore, when the custom filesystem 20 enables fs-verity on the metadata file 28, which contains the metadata of the filesystem 24, the metadata of the filesystem 24 can be sealed and verified. As a result, a change in any of the metadata, such as a change to the permissions 36 of a file (e.g., file 26-1, file 26-2), addition of a file, removal of a file, or replacement of a file, can be detected.

For example, when enabling fs-verity, the custom filesystem 20 can generate Merkle trees 48, including a Merkle tree 50-1 of the metadata file 28 and a Merkle tree 50-2 of the content-addressed object store 22. The Merkle tree 50-1 of the metadata file 28 can contain hashes of blocks corresponding to the contents of the metadata file 28, and the Merkle tree 50-2 of the content-addressed object store 22 can contain hashes of blocks corresponding to the contents of the files (e.g., file 26-1, file 26-2) in the content-addressed object store 22. Because the custom filesystem 20 can enable fs-verity on the metadata file 28 and the content-addressed object store 22 (i.e., generating the Merkle tree 50-1 of the metadata file 28 and the Merkle tree 50-2 of the content-addressed object store 22), both the metadata file 28 and the files (e.g., file 26-1, file 26-2) in the content-addressed object store 22 can be read-only and immutable once fs-verity is enabled. As a result, the contents of both the metadata file 28 and the files (e.g., file 26-1, file 26-2) in the content-addressed object store 22 may be protected from changes.

After generating the Merkle tree 50-1 of the metadata file 28 and the Merkle tree 50-2 of the content-addressed object store 22, the custom filesystem 20 can record digests 52, including a digest 54-1 corresponding to the metadata file 28 and digests 54-2 corresponding to the files (e.g., file 26-1, file 26-2) in the content-addressed object store 22. The digests may be produced when fs-verity hashes the contents of the file that fs-verity is enabled on, resulting in a digest that cryptographically identifies the file contents, such as by containing the computed hashes.

The custom filesystem 20 can verify digests 56 in the kernel 46 of the operating system 18. In particular, the custom filesystem 20 can verify that the digest 54-1 corresponding to the metadata file 28 matches an expected digest 58-1 for the metadata file 28 and that the digests 54-2 corresponding to the files (e.g., file 26-1, file 26-2) in the content-addressed object store 22 match expected digests 58-2 for the files in the content-addressed object store 22. For example, the custom filesystem 20 can verify the contents of the metadata file 28 and the files (e.g., file 26-1, file 26-2) in the content-addressed object store 22, which may both be read-only as a result of enabling fs-verity on the metadata file 28 and the files in the content-addressed object store 22, by comparing the hashes in the expected digest 58-1 for the metadata file 28 to the hashes in the digest 54-1 corresponding to the metadata file 28 (e.g., the hashes in the Merkle tree 50-1 of the metadata file 28) and comparing the hashes in the expected digests 58-2 for the files in the content-addressed object store 22 to the hashes in the digests 54-2 corresponding to the files in the content-addressed object store 22 (e.g., the hashes in the Merkle tree 50-2 of the content-addressed object store 22).

The expected digest 58-1 for the metadata file 28 and the expected digests 58-2 for the files (e.g., file 26-1, file 26-2) in the content-addressed object store 22 may be associated with the digests that are expected upon reading a file from the content-addressed object store 22 or the metadata file 28 after fs-verity was enabled on the files in the content-addressed object store 22 and the metadata file 28, which generated the digest 54-1 corresponding to the metadata file 28 and the digests 54-2 corresponding to the files (e.g., file 26-1, file 26-2) in the content-addressed object store 22. The expected digest 58-1 for the metadata file 28 and the expected digests 58-2 for the files (e.g., file 26-1, file 26-2) in the content-addressed object store 22 may contain Merkle trees with the hashes that are expected for the metadata file 28 and the files in the content-addressed object store 22 respectively. For example, a read of the metadata file 28 may occur, a hash can be computed, which can be identified in a Merkle tree in the expected digest 58-1 for the metadata file 28, and that computed hash can be compared to the hashes in the digest 54-1 corresponding to the metadata file 28 (e.g., the hashes in the Merkle tree 50-1 of the metadata file 28). An error may be returned if the hashes in the expected digest 58-1 for the metadata file 28 and the hashes in the digest 54-1 corresponding to the metadata file 28 do not match. Similar operations can occur for the files (e.g., file 26-1, file 26-2) in the content-addressed object store 22. For example, a read of the content of a file in the content-addressed object store 22, such as the content of the file 26-1, may occur, a hash can be computed, which can be identified in a Merkle tree in the expected digests 58-2 for the file 26-1, and that computed hash can be compared to the hashes in the digests 54-2 corresponding to the file 26-1 (e.g., the hashes in the Merkle tree 50-2 of the content-addressed object store 22). An error may be returned if the hashes in the expected digest 58-2 for the file 26-1 and the hashes in the digests 54-2 corresponding to the file 26-1 do not match. As a result, the backing content (i.e., the content files in the content-addressed object store 22) cannot be changed in any way (e.g., by mistake or malice) without being detected when the backing content (e.g., file 26-1, file 26-2) is read or used, and the metadata (i.e., in the metadata file 28) cannot be changed without being detected, as errors may be returned if the hashes do not match. The verification of the digests can occur at runtime, so the custom filesystem 20 can confirm whether the metadata file 28 and the files (e.g., file 26-1, file 26-2) in the content-addressed object store 22 have been changed at runtime instead of when the content-addressed object store 22 was created. As a result, the content of the files (e.g., file 26-1, file 26-2) in the content-addressed object store 22 and the content-addressed object store 22 can be protected against changes that occur after the content-addressed object store 22 was created.

In some examples, the metadata file 28 may contain the digests 54-2 corresponding to the files (e.g., file 26-1, file 26-2) in the content-addressed object store 22. The custom filesystem 20 may refer to the metadata file 28 in order to verify that the digests 54-2 corresponding to the files (e.g., file 26-1, file 26-2) in the content-addressed object store 22 match the expected digests 58-2 for the files in the content-addressed object store 22. In another example, the content-addressed object store 22 may be named or identified in the digests 54-2 corresponding to the files (e.g., file 26-1, file 26-2) in the content-addressed object store 22. In some examples, the digest 54-1 corresponding to the metadata file 28 may be retrieved from a secure location 60 of the computing device 10 (e.g., a signed kernel 46 command line) in order to ensure that the filesystem 24 is unchanged from the expected state of the filesystem 24. The custom filesystem 20 may access the secure location 60 to retrieve the digest 54-1 corresponding to the metadata file 28 and then verify that the digest 54-1 corresponding to the metadata file 28 matches the expected digest 58-1 for the metadata file 28. In some examples, the location of the digest 54-1 corresponding to the metadata file 28 can be passed to the mount command in order for the custom filesystem 20 to ensure that the filesystem 24 has not been changed.

The custom filesystem 20 can mount 62 the metadata file 28 to a location in the filesystem, which can be identified as a read-only filesystem 64 as a result of fs-verity being enabled on the metadata file 28 and the files (e.g., file 26-1, file 26-2) in the content-addressed object store 22. For instance, the filesystem 24 may be the read-only filesystem 64 as a result of enabling fs-verity. Because fs-verity was enabled on the metadata file 28 and the files (e.g., file 26-1, file 26-2) in the content-addressed object store 22, upon mount 62, there can be full trust of both the data in the content-addressed object store 22 and the metadata of the mounted metadata file 28. The location in the filesystem to mount 62 the metadata file 28 can be determined by a user. For example, a user using the kernel-based operating system command line, such as the Linux command line as a non-limiting example, can use the mount command and pass to the mount command the filename of the metadata file 28 and the path to the directory location to mount 62 the metadata file 28. In some examples, there can be more than one mount 62, such as when more than one metadata file 28 is generated and each metadata file 28 that points to the shared backing store (e.g., content-addressed object store 22) is mounted, so each mount 62 can be a separate filesystem with a shared backing store.

It is to be understood that, because the custom filesystem 20 is a component of the computing device 10, functionality implemented by the custom filesystem 20 may be attributed to the computing device 10 generally. Moreover, in examples where the custom filesystem 20 comprises software instructions that program the processor device 14 to carry out functionality discussed herein, functionality implemented by the custom filesystem 20 may be attributed herein to the processor device 14. It is to be further understood that while, for purposes of illustration only, the custom filesystem 20 is depicted as a single component, the functionality implemented by the custom filesystem 20 may be implemented in any number of components, and the examples discussed herein are not limited to any particular number of components.

Figure 2:
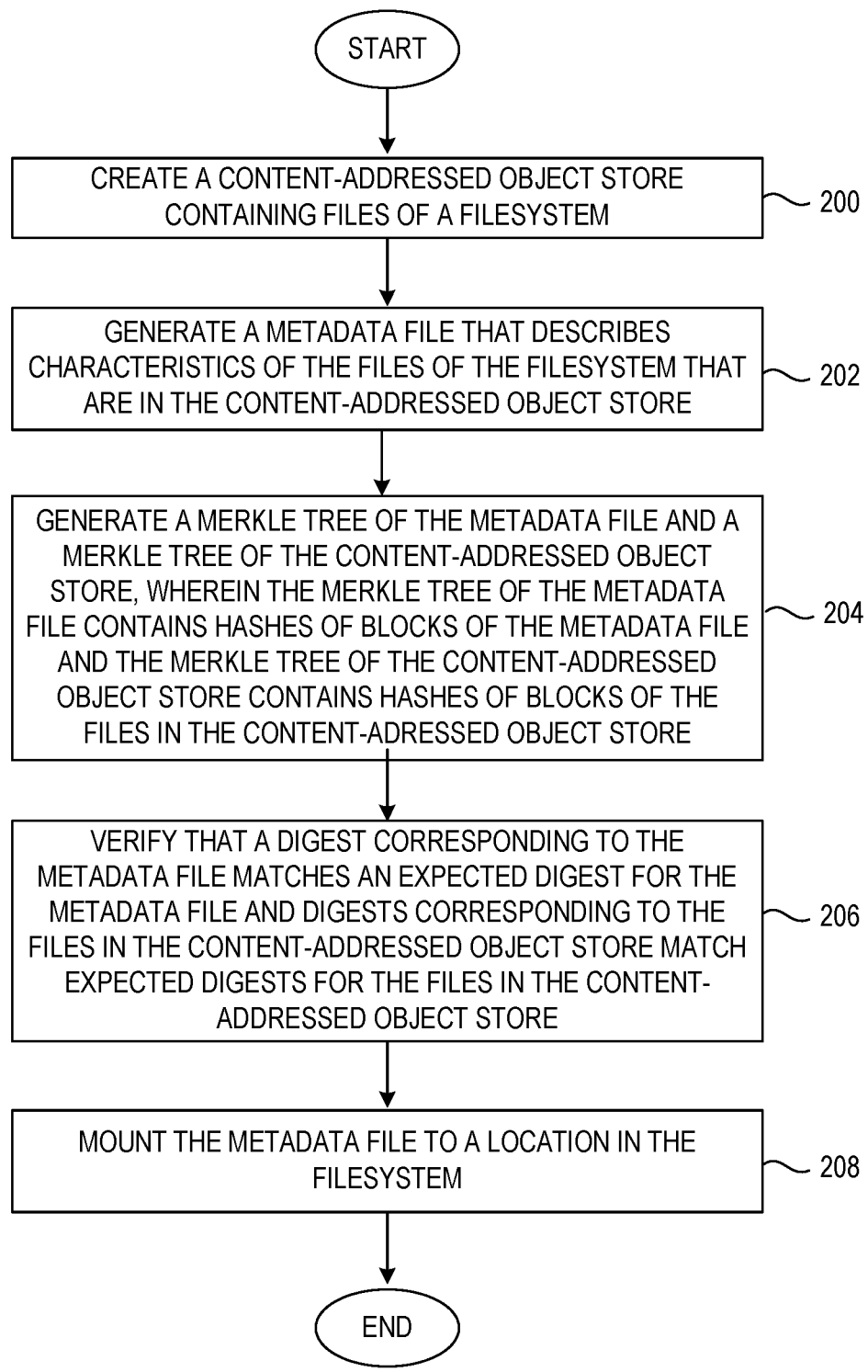
FIG. 2 is a flowchart illustrating operations performed by the computing device of FIG. 1 for securing the contents of a file system, according to one example.

FIG. 2 is a flowchart illustrating operations performed by the computing device of FIG. 1 for securing the contents of a file system, according to one example. Elements of FIG. 1 are referenced in describing FIG. 2 for the sake of clarity. In FIG. 2, operations begin with a processor device of a computing device, such as the processor device 14 of the computing device 10 of FIG. 1, creating a content-addressed object store 22 containing files of a filesystem 24 (block 200). The processor device 14 then generates a metadata file 28 that describes characteristics of the files of the filesystem 24 that are in the content-addressed object store 22 (block 202). The processor device 14 then generates a Merkle tree 50-1 of the metadata file 28 and a Merkle tree 50-2 of the content-addressed object store 22, wherein the Merkle tree 50-1 of the metadata file contains hashes of blocks of the metadata file 28 and the Merkle tree 50-2 of the content-addressed object store 22 contains hashes of blocks of the files in the content-addressed object store 22 (block 204). The processor device 14 then verifies that a digest 54-1 corresponding to the metadata file 28 matches an expected digest 58-1 for the metadata file 28 and digests 54-2 corresponding to the files in the content-addressed object store 22 match expected digests 58-2 for the files in the content-addressed object store 22 (block 206). The processor device 14 then mounts 62 the metadata file 28 to a location in the filesystem (block 208).

Figure 3:
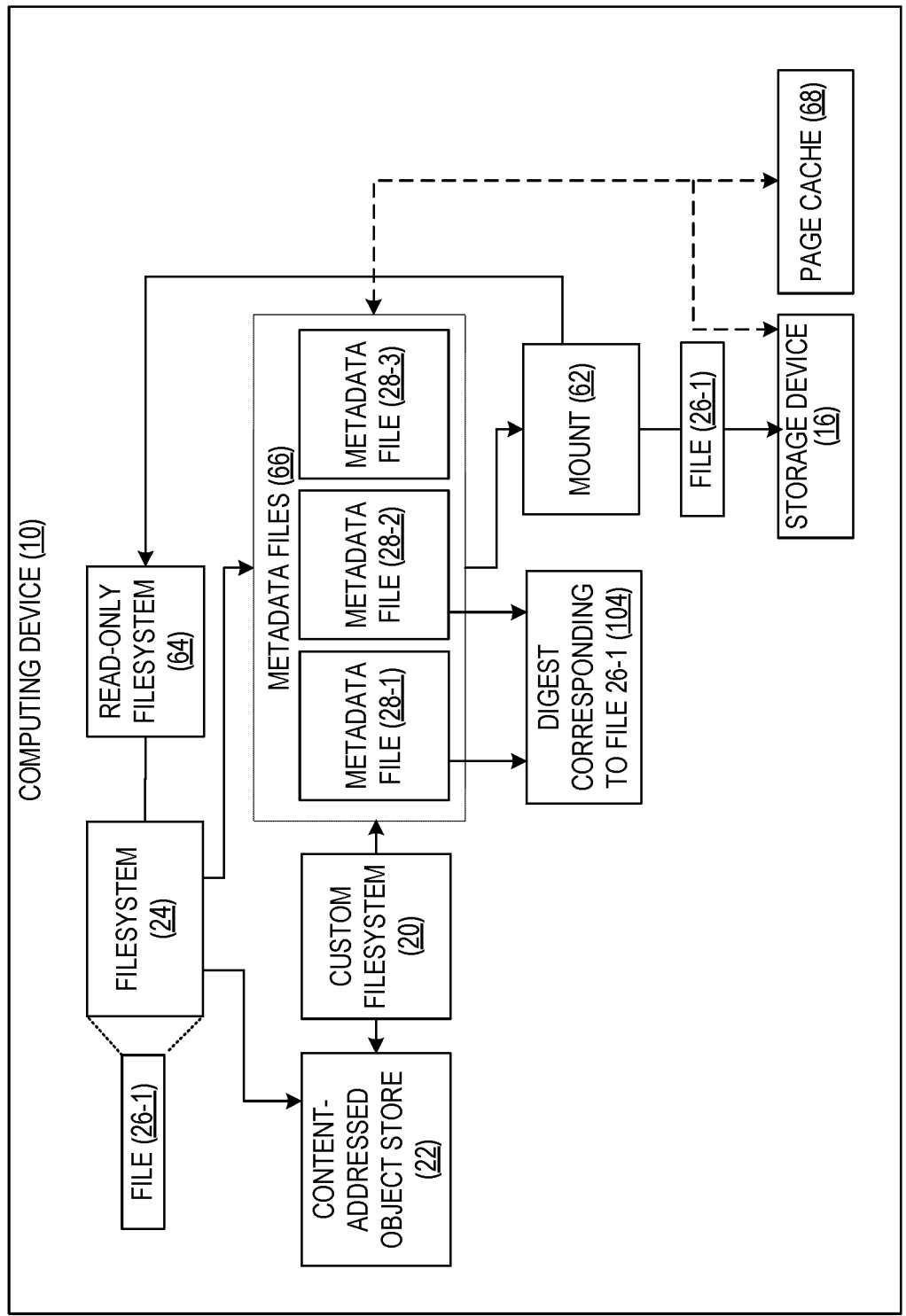
FIG. 3 is a block diagram of the computing device of FIG. 1 for securing the contents of a file system, according to one example.

FIG. 3 is a block diagram of the computing device of FIG. 1 for securing the contents of a file system, according to one example. Elements of FIG. 1 are referenced in describing FIG. 3 for the sake of clarity. In the example of FIG. 3, the content-addressed object store 22 may be shared for a plurality of metadata files 66, and any files (e.g., file 26-1, file 26-2) in the content-addressed object store 22 may be shared if the files have the same content. The custom filesystem 20 may generate a plurality of metadata files 66 (e.g., metadata file 28-1, metadata file 28-2, metadata file 28-3) that are using the content-addressed object store 22. The custom filesystem 20 can enable fs-verity on the plurality of metadata files 66. Two or more of the plurality of metadata files 66 (e.g., metadata file 28-1, metadata file 28-2) may contain an identical digest 104 corresponding to at least one file (e.g., file 26-1) in the content-addressed object store 22. The at least one file (e.g., file 26-1) may thus be shared between the two or more of the plurality of metadata files 66 (e.g., metadata file 28-1, metadata file 28-2), as the file has the same content because the digest is the same. For example, the identical digest 104 can correspond to the file 26-1, and the file 26-1 can be shared between the metadata file 28-1 and the metadata file 28-2.

The custom filesystem 20 can mount 62 the plurality of metadata files 66 to one or more locations in the filesystem, such as the read-only filesystem 64 since fs-verity has been enabled on the plurality of metadata files 66. The at least one file (e.g., file 26-1) with the identical digest 104 (i.e., the shared file) can be stored one time on a disk of the computing device 10, such as on the storage device 16. The at least one file (e.g., file 26-1) can be stored one time even when metadata in the metadata files (e.g., metadata file 28-1, metadata file 28-2, metadata file 28-3) in the plurality of metadata files 66 differs. For example, the metadata in a first metadata file 28-1 from among the plurality of metadata files 66 may be different from the metadata in a second metadata file 28-2 from among the plurality of metadata files 66. The metadata in the first metadata file 28-1 or the second metadata file 28-2 may be the same or different from the metadata in a third metadata file 28-3 from among the plurality of metadata files 66, and the at least one file (e.g., file 26-1) can be stored one time. The at least one file (e.g., file 26-1) can also be shared even when metadata in the metadata files (e.g., metadata file 28-1, metadata file 28-2, metadata file 28-3) in the plurality of metadata files 66 differs. Because the files (e.g., file 26-1, file 26-2) can be content-addressed (i.e., stored in the content-addressed object store 22), shared files can be stored one time and can appear in multiple mounts of the filesystem.

In some examples, the plurality of metadata files 66 may share file data on a disk of the computing device 10, such as on the storage device 16, and in a page cache 68 of the computing device 10. As a result, duplication can be avoided both on disk (e.g., the storage device 16) and in the system memory 12 (e.g., the page cache 68). Any files (e.g., file 26-1, file 26-2) that are shared and in use can share the page cache 68 because the page cache 68 for the contents of the files may be addressed by the backing file in the content-addressed object store 22. For example, any shared libraries between two or more of the plurality of metadata files 66 (e.g., metadata file 28-1, metadata file 28-2) can be mapped one time across all mounts of the filesystem. Sharing can also be anonymous, as the difference between mounted files and a non-shared file may not be determined.

Figure 4:
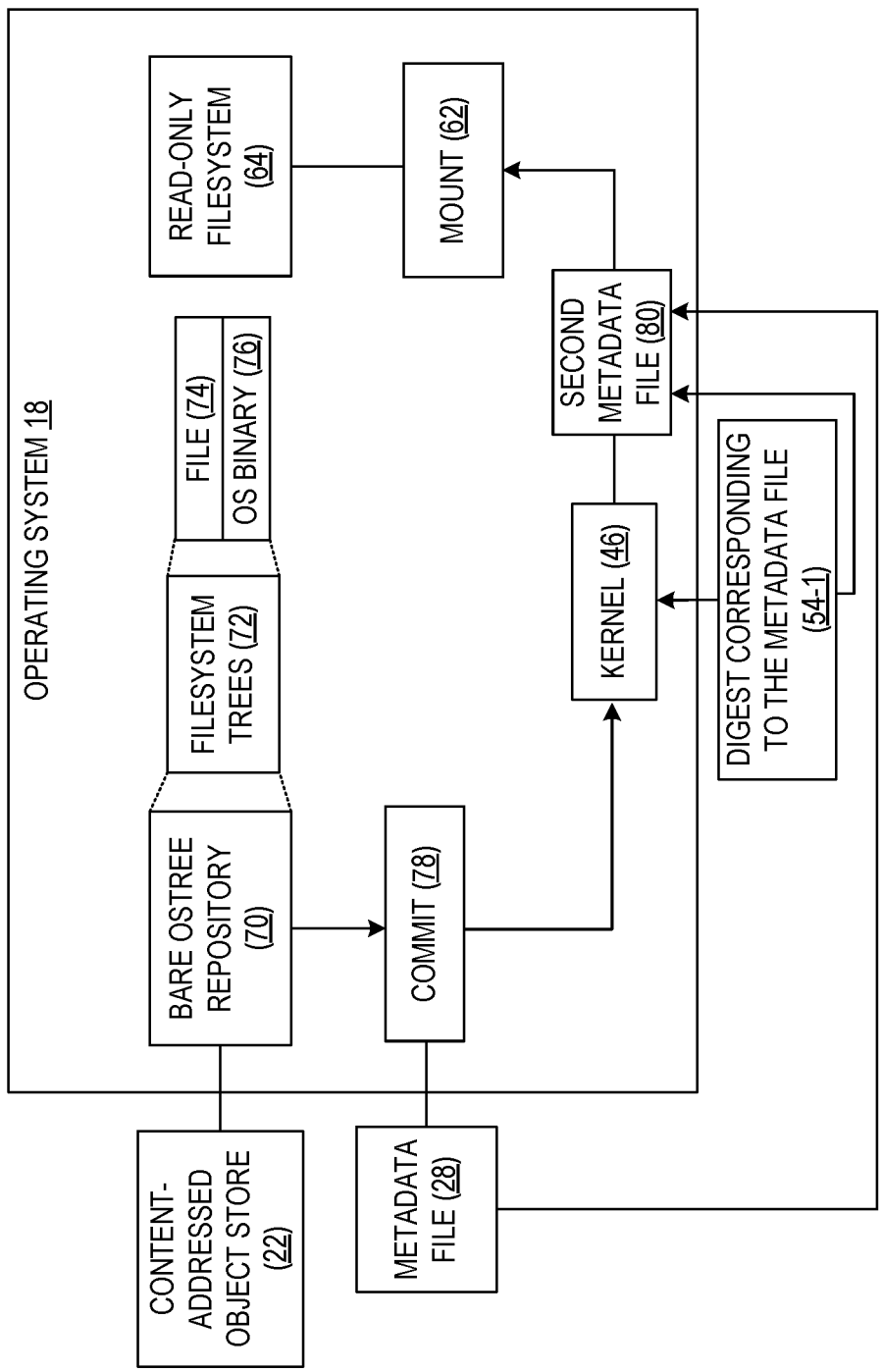
FIG. 4 is a block diagram of the computing device of FIG. 1 for securing the contents of a file system, according to one example.

FIG. 4 is a block diagram of the computing device of FIG. 1 for securing the contents of a file system, according to one example. Elements of FIG. 1 are referenced in describing FIG. 4 for the sake of clarity. In the example of FIG. 4, the content-addressed object store 22 may be an OSTree repository 70 that contains filesystem trees 72 that each contain one or more of content files, such as the file 74, and operating system binaries, such as operating system binary 76.

OSTree is a git-like system for operating system binaries that can work on top of a filesystem of a kernel-based operating system, such as Linux. OSTree can have a git-like content-addressed object store, or OSTree repository, that has branches to track filesystem trees within the content-addressed object store and stores the files that OSTree tracks (i.e., files in the content-addressed object store or repository). The branches can be checked out or committed to, such as when a change is made. Bootable filesystem trees can also be committed and downloaded from the OSTree repository. There can be different versions of the filesystem trees, while any files that are common between the filesystem trees are stored one time in the OSTree repository. In addition, when checked out, the contents of the filesystem trees are checked out into a directory as hard links into the OSTree repository and the directory is mounted when the system boots, which has limitations like the inability to share a content file if metadata that is shared by the hard links differs. For instance, a bare OSTree repository may have content files stored as regular files, acting as a source of hard links that each checkout links into. The custom filesystem 20 can overcome the hard links limitation by creating the metadata file 28 with both the metadata for the directory and pathnames to the files (e.g., in the content-addressed object store 22 or OSTree repository 70) that have the actual file contents, and then mounting the metadata file 28.

In order to boot an OSTree based system, the system performs a checkout to go from a bare repository format to a non-bare repository format and the checkout is then mounted as the filesystem. However, by using a checkout that is then mounted, a mechanism cannot be used in order to ensure that the contents of the filesystem have not been altered. The custom filesystem 20 can be implemented in the kernel 46 to directly convert the bare OSTree repository 70 into a non-bare repository, enable fs-verity in order to secure the content of the filesystem, and directly mount 62 the bare OSTree repository 70 into a location, such as the read-only filesystem 64 where the content is read-only, thus providing the same user experience but with the added security benefit of fs-verity. Enabling fs-verity on the files in the OSTree repository 70 can protect against changes to checkout directories, so files cannot be added, removed, or replaced. As a result, the combination of the Merkle tree from OSTree and fs-verity can provide two layers of security, ensuring that the system has not been tampered with and cannot be tampered with, as the Merkle tree from OSTree ensures that the files of the filesystem are not changed and fs-verity ensures that the content of the files of the filesystem are not changed. Therefore, an OSTree based system can be fully cryptographically sealed by the custom filesystem 20.

For example, instead of checking out a hard linked directory or the filesystem tree 72, the custom filesystem 20 can generate the metadata file 28, enable fs-verity on the metadata file 28, and mount 62 the metadata file 28 to a location in the filesystem. In particular, the metadata file 28 can describe characteristics of the files of the filesystem that are in the content-addressed object store 22, where the content-addressed object store 22 is the OSTree repository 70, and point into the content-addressed object store 22 (i.e., the OSTree repository 70), thereby replacing the hard links. The custom filesystem 20 can enable fs-verity on the metadata file 28, encode the digest 54-1 corresponding to the metadata file 28 in the kernel 46 command line, and mount 62 the metadata file 28 to a location in the filesystem. As a result, a trusted system can be booted, validating all directory metadata and file content, and the directory structure can be validated for post-creation changes (e.g., at runtime), as validation normally only occurs when the content-addressed object store 22 or the OSTree repository 70 is created.

Then a commit 78 can be checked out to a metadata file (e.g., a custom filesystem image). For example, the custom filesystem 20 can perform the commit 78 to the OSTree repository 70. The commit 78 can include changes that were made to the filesystem tree 72 of the OSTree repository 70. The custom filesystem 20 can obtain the metadata file 28, which can include the metadata for the commit 78, and the digest 54-1 corresponding to the metadata file 28. The digest 54-1 corresponding to the metadata file 28 can be added to the metadata file 28 that includes the commit 78 metadata. The metadata file 28 can then be reconstructed from the commit 78, generating a second metadata file 80 that includes the digest 54-1 corresponding to the metadata file 28 and the contents of the metadata file 28, and the second metadata file 80 can be mounted to a location in the filesystem. The second metadata file 80 can therefore contain the same digest as the metadata file 28 (i.e., the digest 54-1 corresponding to the metadata file 28). In some examples, the digest 54-1 corresponding to the metadata file 28 can be generated on a server when building the OSTree commit, the digest 54-1 corresponding to the metadata file 28 can be added to the commit metadata before signing, then the same metadata file 28 can be on the client and validated.

Figure 5:
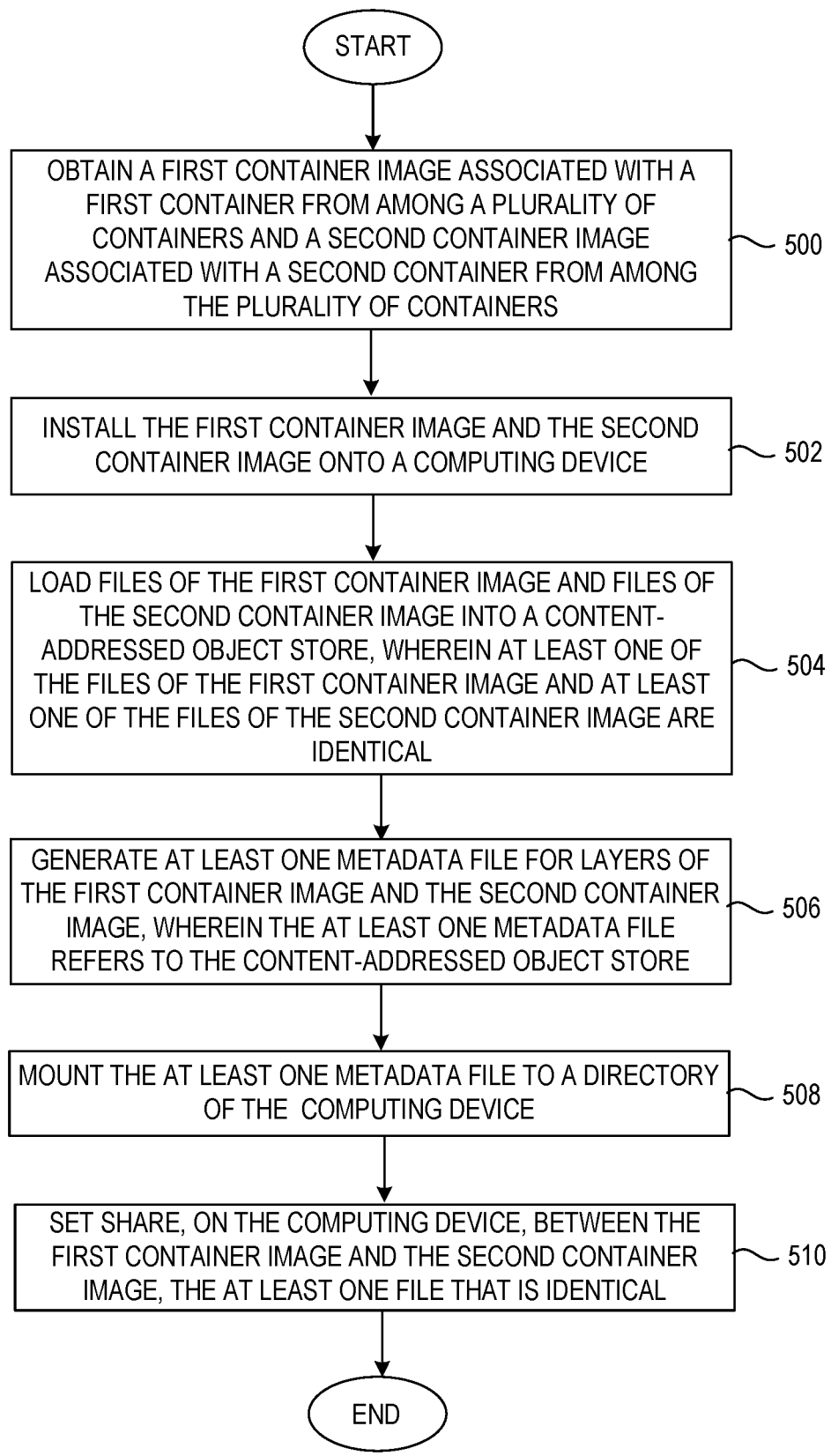
FIG. 5 is a flowchart illustrating operations performed by the computing device of FIG. 1 for securing the contents of a file system, according to another example.

FIG. 5 is a flowchart illustrating operations performed by the computing device of FIG. 1 for securing the contents of a file system, according to another example. Elements of FIG. 1 are referenced in describing FIG. 5 for the sake of clarity. In FIG. 5, operations begin with a processor device of a computing device, such as the processor device 14 of the computing device 10 of FIG. 1, obtaining a first container image associated with a first container from among a plurality of containers and a second container image associated with a second container from among the plurality of containers (block 500). The processor device 14 then installs the first container image and the second container image onto a computing device (block 502). The processor device 14 then loads files of the first container image and files of the second container image into a content-addressed object store, wherein at least one of the files of the first container image and at least one of the files of the second container image are identical (block 504). The processor device 14 then generates at least one metadata file for layers of the first container image and the second container image, wherein the at least one metadata file refers to the content-addressed object store (block 506). The processor device 14 then mounts the at least one metadata file to a directory of the computing device (block 508). The processor device 14 then shares, on the computing device, between the first container image and the second container image, the at least one file that is identical (block 510).

Figure 6:
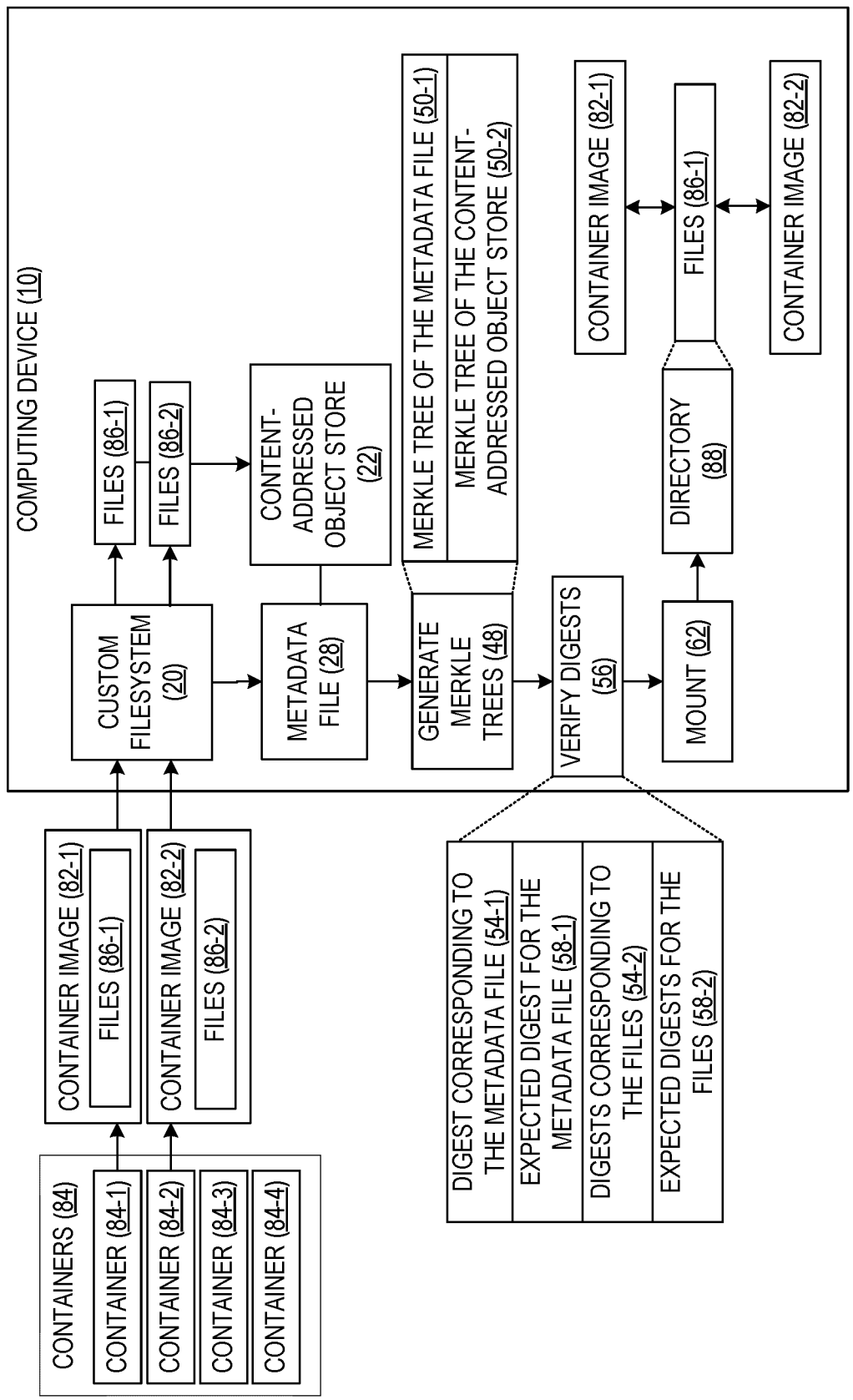
FIG. 6 is a block diagram of the computing device of FIG. 1 for securing the contents of a file system, according to one example.

FIG. 6 is a block diagram of the computing device of FIG. 1 for securing the contents of a file system, according to one example. Elements of FIG. 1 are referenced in describing FIG. 6 for the sake of clarity. In the example of FIG. 6, the custom filesystem 20 can be applied to containers. Containers allow for packaging and isolating applications with their runtime environment. A runtime environment can contain all of the files that are required in order for the applications to execute. All of those files that are required for the applications to execute can be provided in a container image. A container image can be stored as a set of layer directories. Generally, when a container image is pulled to local storage, each layer is extracted individually. However, the custom filesystem 20 can instead store the file content in a content-addressed store and then generate a metadata file (e.g., an image file) for the layer or the combined layers, which allows for the sharing of content files between container images, even when the metadata of the container images differs. A computing system may contain multiple containers which may share files, but the file data is usually replicated for every container image. Additionally, there may be difficulty in sharing individual files between unrelated layers. The custom filesystem 20 can instead use a shared content-addressed store for all container images and generate a metadata file (e.g., an image file) that points into the shared content-addressed store. As a result, the custom filesystem 20 can share files that are identical (i.e., files that are in multiple container images) on a local computing device both on disk and in memory, such as in page cache, which allows for higher density on a cluster of containers and reduced memory requirements on edge nodes. Files used by more than one container simultaneously, such as shared libraries, can also reside in the page cache. Therefore, the custom filesystem 20 can be used to create multiple, different, read-only container image files that all refer to the same object store, so all of the files are stored one time.

The custom filesystem 20 may obtain a first container image 82-1 associated with a first container 84-1 from among a plurality of containers 84 (e.g., container 84-1, container 84-2, container 84-3, container 84-4) and a second container image 82-2 associated with a second container 84-2 from among the plurality of containers 84. The custom filesystem 20 can install the first container image 82-1 and the second container image 82-2 onto the computing device 10. The custom filesystem 20 can load the files 86-1 of the first container image 82-1 and files 86-2 of the second container image 82-2 into the content-addressed object store 22. At least one of the files 86-1 of the first container image 82-1 may be identical to at least one of the files 86-2 of the second container image 82-2. The custom filesystem 20 can generate at least one metadata file 28 for layers of the first container image 82-1 and the second container image 82-2. The metadata file 28 can refer to the content-addressed object store 22 and the files in the content-addressed object store 22, such as the files 86-1 of the first container image 82-1 and the files 86-2 of the second container image 82-2. In some examples, more than one metadata file may be generated, and the metadata files may all refer to the same content-addressed object store 22. In other examples, the custom filesystem 20 can enable fs-verity on the metadata file 28 and the content-addressed object store 22 by, subsequent to generating the at least one metadata file 28, generating Merkle trees 48, such as a Merkle tree 50-1 of the metadata file 28 and a Merkle tree 50-2 of the content-addressed object store 22, and verifying digests 56 by confirming that a digest 54-1 corresponding to the metadata file 28 matches an expected digest 58-1 for the metadata file 28 and digests 54-2 corresponding to the files in the content-addressed object store 22 match expected digests 58-2 for the files in the content-addressed object store 22. The custom filesystem 20 can mount 62 the metadata file 28 to a directory 88 of the computing device 10. The custom filesystem 20 can mount 62 the metadata file 28 for each container image (e.g., first container image 82-1, second container image 82-2). After enabling fs-verity on the at least one metadata file 28, that metadata file 28 is read-only and the metadata or content of the container image cannot be changed. The at least one file that is identical (e.g., file 86-1) may be shared on the computing device 10 between the first container image 82-1 and the second container image 82-2. The identical file can be shared on both on disk (e.g., storage device 18) and in the page cache 68 (e.g., system memory 12). The identical file can be shared even when the metadata of the first container image 82-1 and the metadata of the second container image 82-2 differ in any manner, such as having different timestamps or file ownerships.

Figure 7:
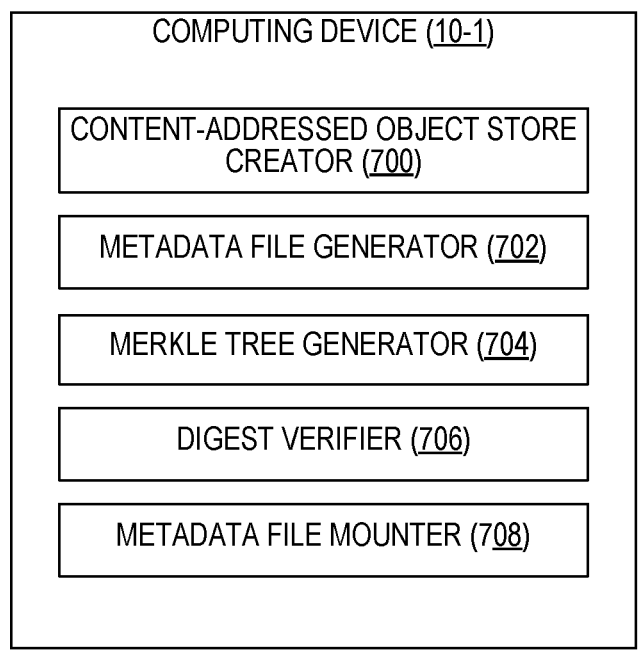
FIG. 7 is a block diagram of a computing device suitable for implementing aspects illustrated in FIGS. 1-4 according to another example.

FIG. 7 is a block diagram of a computing device 10-1 according to another implementation. The computing device 10-1 implements identical functionality as that described above with regard to the computing device 10. The computing device 10-1 includes a content-addressed object store creator 700 to create a content-addressed object store containing files of a filesystem. The content-addressed object store creator 700 may comprise executable software instructions configured to program a processor device to implement the functionality of creating a content-addressed object store containing files of a filesystem, may comprise circuitry including, by way of non-limiting example, an application-specific integrated circuit (ASIC), field-programmable gate array (FPGA), or may comprise a combination of executable software instructions and circuitry.

The computing device 10-1 also includes a metadata file generator 702 to generate a metadata file that describes characteristics of the files of the filesystem that are in the content-addressed object store. The metadata file generator 702 may comprise executable software instructions configured to program a processor device to implement the functionality of generating a metadata file that describes characteristics of the files of the filesystem that are in the content-addressed object store, may comprise circuitry including, by way of non-limiting example, an ASIC, FPGA, or may comprise a combination of executable software instructions and circuitry.

The computing device 10-1 also includes a Merkle tree generator 704 to generate a Merkle tree of the metadata file and a Merkle tree of the content-addressed object store, wherein the Merkle tree of the metadata file contains hashes of blocks of the metadata file and the Merkle tree of the content-addressed object store contains hashes of blocks of the files in the content-addressed object store. The Merkle tree generator 704 may comprise executable software instructions configured to program a processor device to implement the functionality of generating a Merkle tree of the metadata file and a Merkle tree of the content-addressed object store, wherein the Merkle tree of the metadata file contains hashes of blocks of the metadata file and the Merkle tree of the content-addressed object store contains hashes of blocks of the files in the content-addressed object store, may comprise circuitry including, by way of non-limiting example, an ASIC, FPGA, or may comprise a combination of executable software instructions and circuitry.

The computing device 10-1 also includes a digest verifier 706 to verify that a digest corresponding to the metadata file matches an expected digest for the metadata file and digests corresponding to the files in the content-addressed object store match expected digests for the files in the content-addressed object store. In some implementations, the digest verifier 706 verifies that a digest corresponding to the metadata file matches an expected digest for the metadata file and digests corresponding to the files in the content-addressed object store match expected digests for the files in the content-addressed object store by retrieving the digest corresponding to the metadata file from a secure location. The digest verifier 706 may comprise executable software instructions configured to program a processor device to implement the functionality of verifying that a digest corresponding to the metadata file matches an expected digest for the metadata file and digests corresponding to the files in the content-addressed object store match expected digests for the files in the content-addressed object store, may comprise circuitry including, by way of non-limiting example, an ASIC, FPGA, or may comprise a combination of executable software instructions and circuitry.

The computing device 10-1 also includes a metadata file mounter 708 to mount the metadata file to a location in the filesystem. The metadata file mounter 708 may comprise executable software instructions configured to program a processor device to implement the functionality of mounting the metadata file to a location in the filesystem, may comprise circuitry including, by way of non-limiting example, an ASIC, FPGA, or may comprise a combination of executable software instructions and circuitry.

Figure 8:
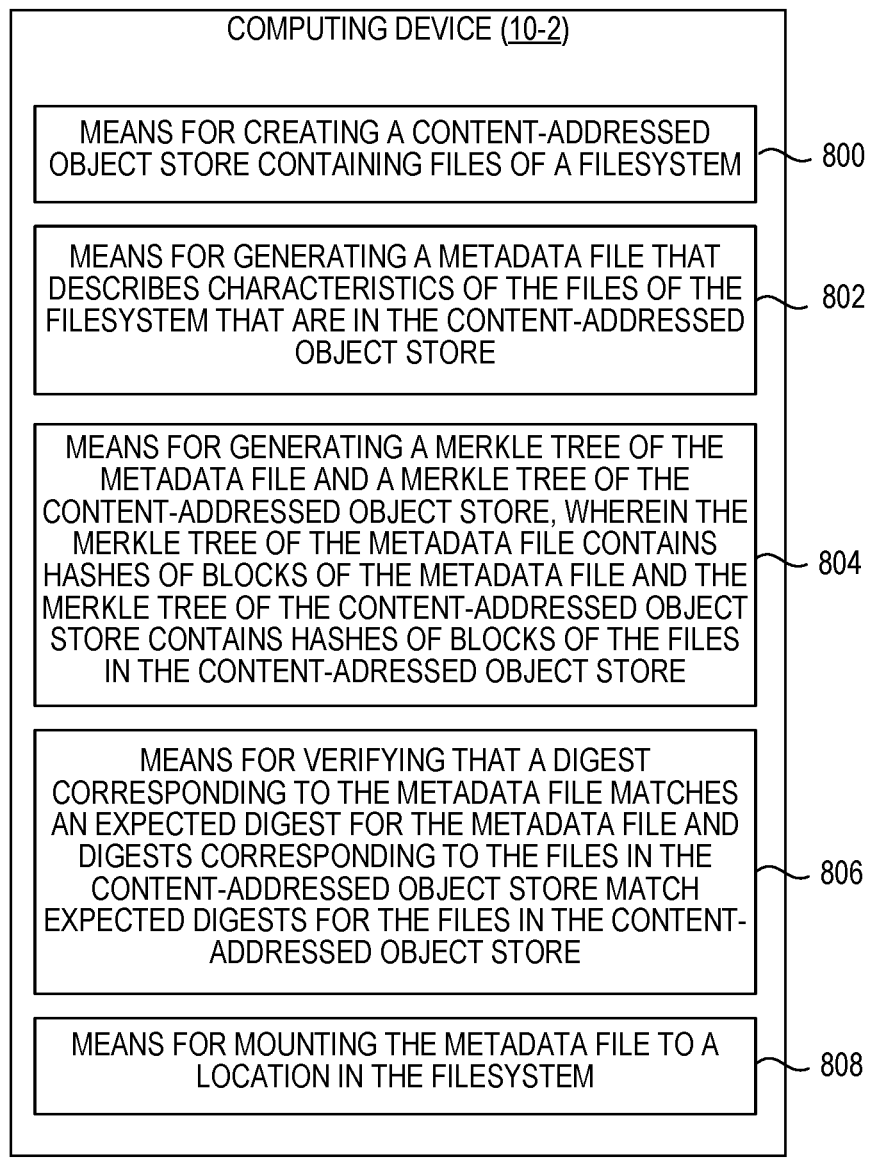
FIG. 8 is a block diagram of the computing device of FIG. 1 for securing the contents of a file system, according to another example.

FIG. 8 is a block diagram of a computing device 10-2 according to additional implementations. The computing device 10-2 implements identical functionality as that described above with regard to the computing device 10. In this implementation, the computing device 10-2 includes a means 800 for creating a content-addressed object store containing files of a filesystem. The means 800 may be implemented in any number of manners, including, for example via the content-addressed object store creator 700 illustrated in FIG. 7.

The computing device 10-2 also includes a means 802 for generating a metadata file that describes characteristics of the files of the filesystem that are in the content-addressed object store. The means 802 may be implemented in any number of manners, including, for example via the metadata file generator 702 illustrated in FIG. 7.

The computing device 10-2 also includes a means 804 for generating a Merkle tree of the metadata file and a Merkle tree of the content-addressed object store, wherein the Merkle tree of the metadata file contains hashes of blocks of the metadata file and the Merkle tree of the content-addressed object store contains hashes of blocks of the files in the content-addressed object store. The means 804 may be implemented in any number of manners, including, for example via the Merkle tree generator 704 illustrated in FIG. 7.

The computing device 10-2 also includes a means 806 for verifying that a digest corresponding to the metadata file matches an expected digest for the metadata file and digests corresponding to the files in the content-addressed object store match expected digests for the files in the content-addressed object store. The means 806 may in some implementations, retrieve the digest corresponding to the metadata file from a secure location. The means 806 may be implemented in any number of manners, including, for example via the digest verifier 706 illustrated in FIG. 7.

The computing device 10-2 also includes a means 808 for mounting the metadata file to a location in the filesystem. The means 808 may be implemented in any number of manners, including, for example via the metadata file mounter 708 illustrated in FIG. 7.

Figure 9:
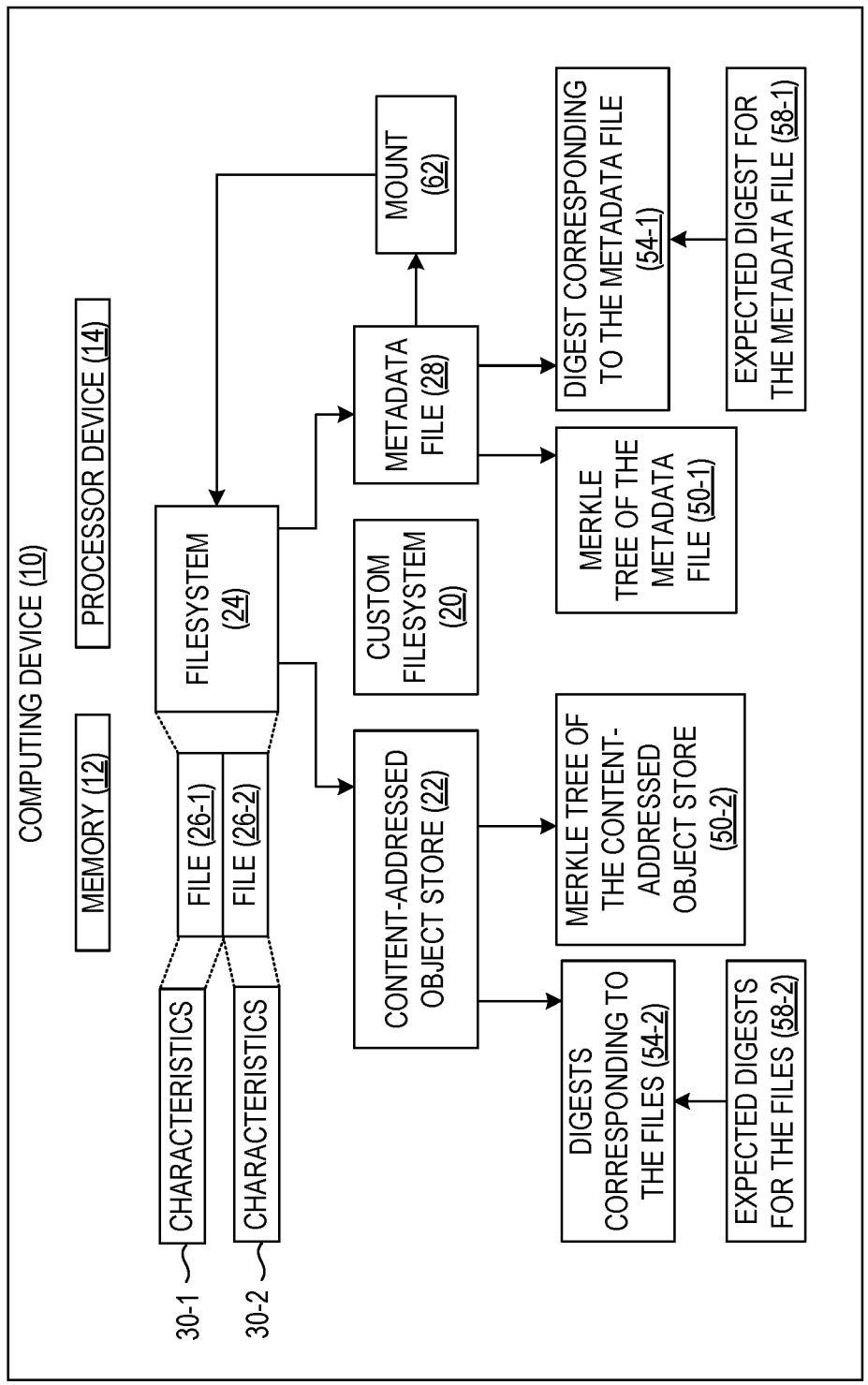
FIG. 9 is a block diagram of the computing device of FIG. 1 for securing the contents of a file system, according to one example.

FIG. 9 is a simpler block diagram of the computing device of FIG. 1 for securing the contents of a file system, according to one example. Elements of FIG. 1 are referenced in describing FIG. 9 for the sake of clarity. In the example of FIG. 9, the computing device 10 includes the custom filesystem 20, a system memory 12, and a processor device 14 coupled to the system memory 12. The processor device 14 is to create a content-addressed object store 22 containing files (e.g., file 26-1, file 26-2) of a filesystem 24. The processor device 14 is further to generate a metadata file 28 that describes characteristics (e.g., characteristics 30-1, characteristics 30-2) of the files (e.g., file 26-1, file 26-2) of the filesystem 24 that are in the content-addressed object store 22. The processor device 14 is further to generate a Merkle tree 50-1 of the metadata file 28 and a Merkle tree 50-2 of the content-addressed object store 22, wherein the Merkle tree 50-1 of the metadata file 28 contains hashes of blocks of the metadata file 28 and the Merkle tree 50-2 of the content-addressed object store 22 contains hashes of blocks of the files in the content-addressed object store 22. The processor device 14 is further to verify that a digest 54-1 corresponding to the metadata file 28 matches an expected digest 58-1 for the metadata file 28 and digests 54-2 corresponding to the files in the content-addressed object store 22 match expected digests 58-2 for the files in the content-addressed object store 22. The processor device 14 is further to mount 62 the metadata file 28 to a location in the filesystem 24.

Figure 10:
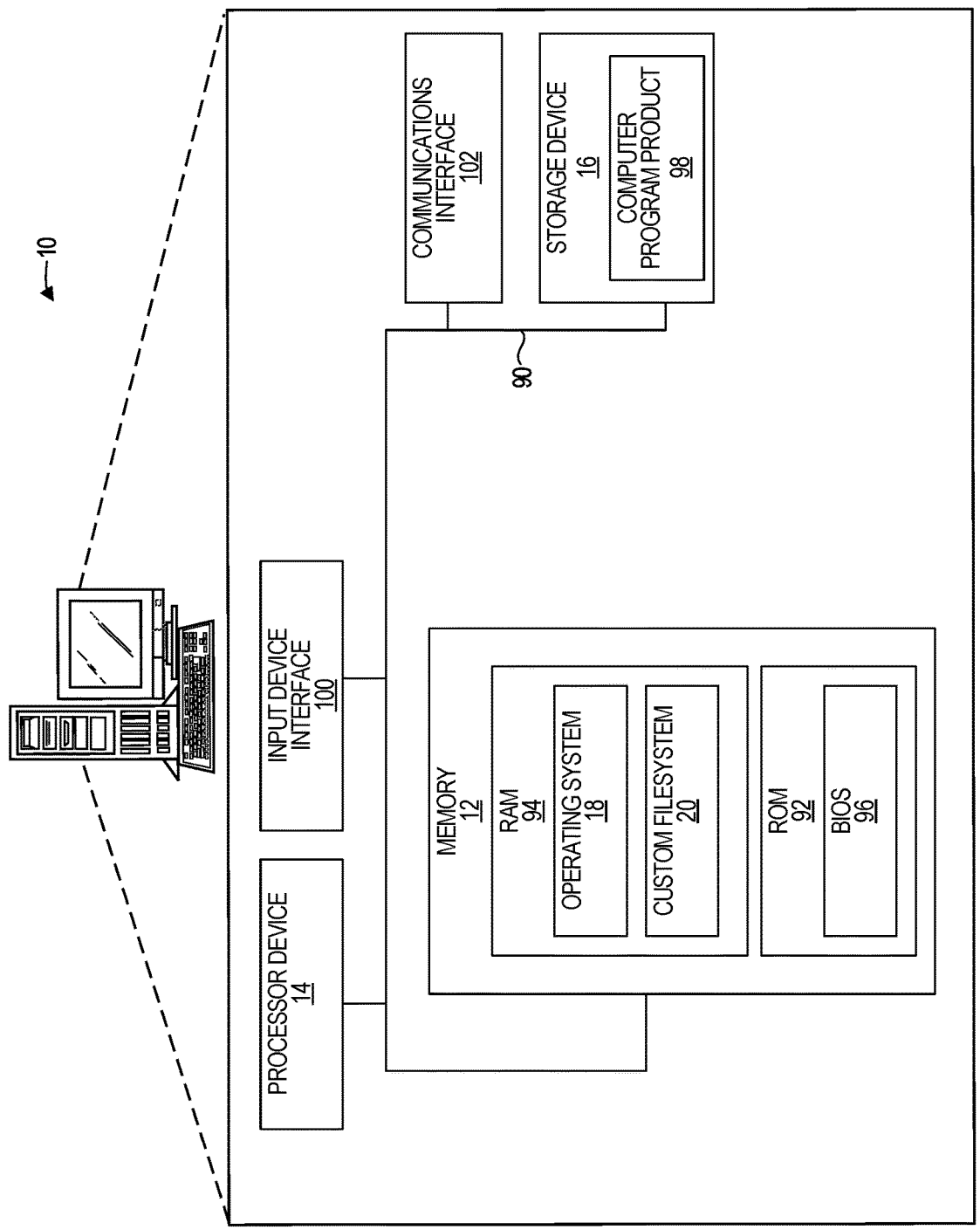
FIG. 10 is a block diagram of a computing device suitable for implementing examples, according to one example.

FIG. 10 is a block diagram of the computing device 10 suitable for implementing examples according to one example. The computing device 10 may comprise any computing or electronic device capable of including firmware, hardware, and/or executing software instructions to implement the functionality described herein. The computing device 10 includes the processor device 14, the system memory 12, and a system bus 90. The system bus 90 provides an interface for system components including, but not limited to, the system memory 12 and the processor device 14. The processor device 14 can be any commercially available or proprietary processor.

The system bus 90 may be any of several types of bus structures that may further interconnect to a memory bus (with or without a memory controller), a peripheral bus, and/or a local bus using any of a variety of commercially available bus architectures. The system memory 12 may include non-volatile memory 92 (e.g., read-only memory (ROM), erasable programmable read-only memory (EPROM), electrically erasable programmable read-only memory (EEPROM), etc.), and volatile memory 94 (e.g., random-access memory (RAM)). A basic input/output system (BIOS) 96 may be stored in the non-volatile memory 92 and can include the basic routines that help to transfer information between elements within the computing device 10. The volatile memory 94 may also include a high-speed RAM, such as static RAM, for caching data.

The computing device 10 may further include or be coupled to a non-transitory computer-readable storage medium such as a storage device 16, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 16 and other drives associated with computer-readable media and computer-usable media may provide non-volatile storage of data, data structures, computer-executable instructions, and the like.

A number of modules can be stored in the storage device 16 and in the volatile memory 94, including the operating system 18 and one or more program modules, such as the custom filesystem 20, which may implement the functionality described herein in whole or in part. All or a portion of the examples may be implemented as a computer program product 98 stored on a transitory or non-transitory computer-usable or computer-readable storage medium, such as the storage device 16, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. The processor device 14, in conjunction with the custom filesystem 20 in the volatile memory 94, may serve as a controller, or control system, for the computing device 10 that is to implement the functionality described herein.

An operator, such as a user, may also be able to enter one or more configuration commands through a keyboard (not illustrated), a pointing device such as a mouse (not illustrated), or a touch-sensitive surface such as a display device (not illustrated). Such input devices may be connected to the processor device 14 through an input device interface 100 that is coupled to the system bus 90 but can be connected by other interfaces such as a parallel port, an Institute of Electrical and Electronic Engineers (IEEE) 1394 serial port, a Universal Serial Bus (USB) port, an IR interface, and the like. The computing device 10 may also include a communications interface 102 suitable for communicating with the network as appropriate or desired. The computing device 10 may also include a video port (not illustrated) configured to interface with the display device (not illustrated), to provide information to the user.

Other computer system designs and configurations may also be suitable to implement the systems and methods described herein. The following examples illustrate various implementations in accordance with one or more aspects of the disclosure.

Example 1 is a method comprising obtaining a first container image associated with a first container from among a plurality of containers and a second container image associated with a second container from among the plurality of containers; installing the first container image and the second container image onto a computing device; loading files of the first container image and files of the second container image into a content-addressed object store, wherein at least one of the files of the first container image and at least one of the files of the second container image are identical; generating at least one metadata file for layers of the first container image and the second container image, wherein the at least one metadata file refers to the content-addressed object store; mounting the at least one metadata file to a directory of the computing device; and sharing, on the computing device, between the first container image and the second container image, the at least one file that is identical.

Example 2 is the method of example 1 wherein the at least one metadata file refers to files in the content-addressed object store.

Example 3 is the method of example 1 wherein sharing, on the computing device, between the first container image and the second container image, the at least one file that is identical comprises sharing the at least one file that is identical when the metadata of the first container image and the second container image differ.

Example 4 is the method of example 1 further comprising, subsequent to generating the at least one metadata file, generating a Merkle tree of the metadata file and a Merkle tree of the content-addressed object store, wherein the Merkle tree of the metadata file contains hashes of blocks of the metadata file and the Merkle tree of the content-addressed object store contains hashes of blocks of the files in the content-addressed object store; and verifying that a digest corresponding to the metadata file matches an expected digest for the metadata file and digests corresponding to the files in the content-addressed object store match expected digests for the files in the content-addressed object store.

Example 5 is the method of example 4 wherein, subsequent to verifying that a digest corresponding to the metadata file matches an expected digest for the metadata file and digests corresponding to the files in the content-addressed object store match expected digests for the files in the content-addressed object store, the at least one metadata file is read-only.

Example 6 is the method of example 1 wherein sharing, on the computing device, between the first container image and the second container image, the at least one file that is identical comprises sharing the at least one file that is identical on a storage device and in a page cache.

Example 7 is a computing device that includes a memory and a processor device coupled to the memory. The processor device is to obtain a first container image associated with a first container from among a plurality of containers and a second container image associated with a second container from among the plurality of containers; install the first container image and the second container image onto a computing device; load files of the first container image and files of the second container image into a content-addressed object store, wherein at least one of the files of the first container image and at least one of the files of the second container image are identical; generate at least one metadata file for layers of the first container image and the second container image, wherein the at least one metadata file refers to the content-addressed object store; mount the at least one metadata file to a directory of the computing device; and share, on the computing device, between the first container image and the second container image, the at least one file that is identical.

Example 8 is the computing device of example 7 wherein the at least one metadata file refers to files in the content-addressed object store.

Example 9 is the computing device of example 7 wherein to share, on the computing device, between the first container image and the second container image, the at least one file that is identical comprises sharing the at least one file that is identical when the metadata of the first container image and the second container image differ.

Example 10 is the computing device of example 7 wherein the processor device is further to, subsequent to generate the at least one metadata file, generate a Merkle tree of the metadata file and a Merkle tree of the content-addressed object store, wherein the Merkle tree of the metadata file contains hashes of blocks of the metadata file and the Merkle tree of the content-addressed object store contains hashes of blocks of the files in the content-addressed object store; and verify that a digest corresponding to the metadata file matches an expected digest for the metadata file and digests corresponding to the files in the content-addressed object store match expected digests for the files in the content-addressed object store.

Example 11 is the computing device of example 10 wherein, subsequent to verify that a digest corresponding to the metadata file matches an expected digest for the metadata file and digests corresponding to the files in the content-addressed object store match expected digests for the files in the content-addressed object store, the at least one metadata file is read-only.

Example 12 is the computing device of example 7 wherein to share, on the computing device, between the first container image and the second container image, the at least one file that is identical comprises sharing the at least one file that is identical on a storage device and in a page cache.

Example 13 is a non-transitory computer-readable storage medium that includes computer-executable instructions that, when executed, cause one or more processor devices to obtain a first container image associated with a first container from among a plurality of containers and a second container image associated with a second container from among the plurality of containers; install the first container image and the second container image onto a computing device; load files of the first container image and files of the second container image into a content-addressed object store, wherein at least one of the files of the first container image and at least one of the files of the second container image are identical; generate at least one metadata file for layers of the first container image and the second container image, wherein the at least one metadata file refers to the content-addressed object store; mount the at least one metadata file to a directory of the computing device; and share, on the computing device, between the first container image and the second container image, the at least one file that is identical.

Example 14 is the non-transitory computer-readable storage medium of example 13 wherein the at least one metadata file refers to files in the content-addressed object store.

Example 15 is the non-transitory computer-readable storage medium of example 13 wherein to share, on the computing device, between the first container image and the second container image, the at least one file that is identical comprises sharing the at least one file that is identical when the metadata of the first container image and the second container image differ.

Example 16 is the non-transitory computer-readable storage medium of example 13 wherein the instructions are further to cause the processor device to, subsequent to generate the at least one metadata file, generate a Merkle tree of the metadata file and a Merkle tree of the content-addressed object store, wherein the Merkle tree of the metadata file contains hashes of blocks of the metadata file and the Merkle tree of the content-addressed object store contains hashes of blocks of the files in the content-addressed object store; and verify that a digest corresponding to the metadata file matches an expected digest for the metadata file and digests corresponding to the files in the content-addressed object store match expected digests for the files in the content-addressed object store.

Example 17 is the non-transitory computer-readable storage medium of example 16 wherein, subsequent to verify that a digest corresponding to the metadata file matches an expected digest for the metadata file and digests corresponding to the files in the content-addressed object store match expected digests for the files in the content-addressed object store, the at least one metadata file is read-only.

Example 18 is the non-transitory computer-readable storage medium of example 13 wherein to share, on the computing device, between the first container image and the second container image, the at least one file that is identical comprises sharing the at least one file that is identical on a storage device and in a page cache.

Individuals will recognize improvements and modifications to the preferred examples of the disclosure. All such improvements and modifications are considered within the scope of the concepts disclosed herein and the claims that follow.

What is claimed is:

1. A method, comprising:
creating, by a computing device executing a kernel-based operating system, a content-addressed object store containing files of a filesystem;
generating, by the computing device, a metadata file that describes characteristics of the files of the filesystem that are in the content-addressed object store;
generating, by the computing device in a kernel of the kernel-based operating system, a Merkle tree of the metadata file and a Merkle tree of the content-addressed object store, wherein the Merkle tree of the metadata file contains hashes of blocks of the metadata file and the Merkle tree of the content-addressed object store contains hashes of blocks of the files in the content-addressed object store;
verifying, by the computing device in the kernel of the kernel-based operating system, that a digest corresponding to the metadata file matches an expected digest for the metadata file and digests corresponding to the files in the content-addressed object store match expected digests for the files in the content-addressed object store; and
mounting, by the computing device, the metadata file to a location in the filesystem.

2. The method of claim 1, wherein, subsequent to generating the Merkle tree of the metadata file and the content-addressed object store, the metadata file and the files in the content-addressed object store are read-only.

3. The method of claim 1, further comprising, subsequent to generating the Merkle tree of the metadata file and the content-addressed object store, recording the digest corresponding to the metadata file and the digests corresponding to the files in the content-addressed object store.

4. The method of claim 1, wherein verifying that the digest corresponding to the metadata file matches the expected digest for the metadata file comprises retrieving the digest corresponding to the metadata file from a secure location.

5. The method of claim 1, wherein the content-addressed object store is named in the digests corresponding to the files in the content-addressed object store.

6. The method of claim 1, wherein the metadata file contains the digests corresponding to the files in the content-addressed object store.

7. The method of claim 1, wherein the metadata file contains one or more of file names, owner information, permissions, timestamps, extended attributes, directory structure, and paths of the files in the filesystem.

8. The method of claim 1, wherein the metadata file does not include contents of the files in the filesystem.

9. The method of claim 1, wherein the location in the filesystem is determined by a user.

10. The method of claim 1, wherein verifying that the digest corresponding to the metadata file matches the expected digest for the metadata file and the digests corresponding to the files in the content-addressed object store match the expected digests for the files in the content-addressed object store occurs at runtime.

11. The method of claim 1, further comprising:
generating a plurality of metadata files, wherein two or more of the metadata files contain an identical digest corresponding to at least one file in the content-addressed object store;
mounting the plurality of metadata files to one or more locations in the filesystem; and
storing the at least one file once on a disk of the computing device.

12. The method of claim 11, wherein the plurality of metadata files share file data on disk and in page cache.

13. The method of claim 11, wherein metadata in a first metadata file from among the plurality of metadata files differs from metadata in a second metadata file from among the plurality of metadata files.

14. The method of claim 1, wherein the content-addressed object store comprises an OSTree repository containing filesystem trees that each contain one or more of content files and operating system binaries.

15. The method of claim 14, further comprising:
subsequent to mounting the metadata file, performing an OSTree commit, wherein the OSTree commit comprises changes to a filesystem tree of the OSTree repository;
obtaining the metadata file and the digest corresponding to the metadata file, wherein the metadata file includes metadata for the OSTree commit;
adding the digest corresponding to the metadata file to the metadata file;
generating a second metadata file, wherein the second metadata file contains the digest corresponding to the metadata and the metadata file; and
mounting the second metadata file to a location in the filesystem.

16. A computing device, comprising:
a memory; and
a processor device coupled to the memory, the processor device to:
create a content-addressed object store containing files of a filesystem;
generate a metadata file that describes characteristics of the files of the filesystem that are in the content-addressed object store;
generate a Merkle tree of the metadata file and a Merkle tree of the content-addressed object store, wherein the Merkle tree of the metadata file contains hashes of blocks of the metadata file and the Merkle tree of the content-addressed object store contains hashes of blocks of the files in the content-addressed object store;
verify that a digest corresponding to the metadata file matches an expected digest for the metadata file and digests corresponding to the files in the content-addressed object store match expected digests for the files in the content-addressed object store; and
mount the metadata file to a location in the filesystem.

17. The computing device of claim 16, wherein, subsequent to generating the Merkle tree of the metadata file and the content-addressed object store, the metadata file and the files in the content-addressed object store are read-only.

18. The computing device of claim 16, wherein the processor device is further to, subsequent to generating the Merkle tree of the metadata file and the content-addressed object store, record the digest corresponding to the metadata file and the digests corresponding to the files in the content-addressed object store.

19. The computing device of claim 16, wherein the processor device is further to:
generate a plurality of metadata files, wherein two or more of the metadata files contain an identical digest corresponding to at least one file in the content-addressed object store;
mount the plurality of metadata files to one or more locations in the filesystem; and
store the at least one file once on a disk of the computing device.

20. A non-transitory computer-readable storage medium that includes computer-executable instructions that, when executed, cause one or more processor devices to:
create a content-addressed object store containing files of a filesystem;
generate a metadata file that describes characteristics of the files of the filesystem that are in the content-addressed object store;
generate a Merkle tree of the metadata file and a Merkle tree of the content-addressed object store, wherein the Merkle tree of the metadata file contains hashes of blocks of the metadata file and the Merkle tree of the content-addressed object store contains hashes of blocks of the files in the content-addressed object store;
verify that a digest corresponding to the metadata file matches an expected digest for the metadata file and digests corresponding to the files in the content-addressed object store match expected digests for the files in the content-addressed object store; and
mount the metadata file to a location in the filesystem.

* * * * *